US012600415B2

(12) United States Patent (10) Patent No.: US 12,600,415 B2
Sviberg et al. (45) Date of Patent: Apr. 14, 2026

(54) MOTOR VEHICLE COMPRISING A ROOF MODULE AND AT LEAST TWO ENVIRONMENT SENSORS

(71) Applicant: Webasto SE, Stockdorf (DE)

(72) Inventors: Magnus Sviberg, Stockdorf (DE);
Maximilian Ehrmann, Stockdorf (DE);
Cédric Langlais, Stockdorf (DE);
Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 397 days.

(21) Appl. No.: 18/201,326

(22) Filed: May 24, 2023

(65) Prior Publication Data

US 2023/0399057 A1 Dec. 14, 2023

(30) Foreign Application Priority Data

Jun. 14, 2022 (DE) ...................... 10 2022 114 950.1

(51) Int. Cl.
*B62D 25/06* (2006.01)
*B60R 11/00* (2006.01)
*B62D 27/02* (2006.01)

(52) U.S. Cl.
CPC .............. *B62D 25/06* (2013.01); *B60R 11/00* (2013.01); *B62D 27/023* (2013.01); *B60R 2011/004* (2013.01)

(58) Field of Classification Search
CPC ....... B62D 25/06; B62D 27/023; B60R 11/00; B60R 2011/004
See application file for complete search history.

(56) References Cited

U.S. PATENT DOCUMENTS

| | | | | |
|---|---|---|---|---|
| 10,099,630 B1* | 10/2018 | Krishnan | .............. | G01S 7/4813 |
| 10,766,430 B2* | 9/2020 | Frederick | ................ | B60R 11/00 |
| 11,240,941 B2* | 2/2022 | Frederick | ............ | G05D 1/0088 |
| 11,858,425 B2* | 1/2024 | Higashimachi | ......... | B60R 11/00 |
| 12,092,755 B2* | 9/2024 | Huelsen | ................ | G01S 7/4813 |
| 12,172,604 B2* | 12/2024 | Huelsen | ................ | B62D 25/06 |
| 12,194,928 B2* | 1/2025 | Langlais | ................ | B60R 11/04 |

(Continued)

FOREIGN PATENT DOCUMENTS

| | | | | | |
|---|---|---|---|---|---|
| CN | 115743315 A | * | 3/2023 | ............ | B62D 25/06 |
| DE | 202004020891 U1 | | 4/2006 | | |

(Continued)

*Primary Examiner* — Faye M Fleming

(74) *Attorney, Agent, or Firm* — Fitch, Even, Tabin & Flannery, LLP

(57) ABSTRACT

A motor vehicle having a vehicle body, a windshield and/or a rear window, and a roof module disposed on the vehicle body as a structural unit and at least partially forming a vehicle roof of the motor vehicle, the roof module having a see-through area, a panel component which at least partially forms a roof skin of the vehicle roof, the roof skin serving as an outer sealing surface, and at least two environment sensors for detecting a vehicle environment. One of the at least two environment sensors is attached to the roof module and configured to send and/or receive electromagnetic signals through the windshield or the rear window in detect a vehicle environment, and another one of the at least two environment sensors is attached to the roof module and configured to send and/or receive electromagnetic signals through the see-through area.

12 Claims, 2 Drawing Sheets

(56) References Cited

U.S. PATENT DOCUMENTS

| | | | |
|---|---|---|---|
| 12,319,245 B2 * | 6/2025 | Huelsen .................... | B60S 1/56 |
| 12,319,349 B2 * | 6/2025 | Huelsen ................ | B60R 16/037 |
| 2017/0305360 A1 * | 10/2017 | Zajac ..................... | B60R 11/04 |
| 2017/0369003 A1 | 12/2017 | Williams | |
| 2019/0077376 A1 * | 3/2019 | Baldovino ................ | B60S 1/52 |
| 2019/0210436 A1 * | 7/2019 | Frederick ................ | B60J 7/043 |
| 2023/0073687 A1 * | 3/2023 | Lindner ................ | B60H 1/245 |
| 2024/0042835 A1 * | 2/2024 | Ehrmann ................ | B60S 1/528 |
| 2024/0308434 A1 * | 9/2024 | Schieder ................. | B60R 11/00 |
| 2024/0359546 A1 * | 10/2024 | Sviberg ................... | B60S 1/56 |
| 2025/0018875 A1 * | 1/2025 | Sviberg ................. | B60R 11/04 |

FOREIGN PATENT DOCUMENTS

| | | | | |
|---|---|---|---|---|
| DE | 102022124290 A1 * | 3/2024 | ............ | B62D 25/06 |
| KR | 19980061886 A * | 10/1998 | ......... | B60H 1/00978 |

* cited by examiner

MOTOR VEHICLE COMPRISING A ROOF MODULE AND AT LEAST TWO ENVIRONMENT SENSORS

CROSS-REFERENCE TO RELATED APPLICATION

This application claims priority from German Patent Application Number 10 2022 114 950.1, filed on Jun. 14, 2022, which is hereby incorporated herein by reference in its entirety for all purposes.

FIELD

The invention relates to a motor vehicle according to the preamble of claim 1. Furthermore, the invention relates to a motor vehicle according to the preamble of claim 11.

BACKGROUND

Generic motor vehicles having a vehicle body, a windshield and/or a rear window, and a roof module are known. Roof modules, in particular, are widely used in vehicle manufacturing. For example, roof modules are prefabricated as separate functional modules and are connected to a roof frame structure (which is part of a body structure) at the assembly line. The roof module at least partially forms a roof skin of the vehicle roof, which prevents moisture and air flows from entering the vehicle interior. The roof skin is composed of one or more panel components, which can be made of a stable material, such as painted metal or painted or solid-colored plastic. The roof module can be a part of a fixed vehicle roof or a part of an openable roof sub-assembly, which comprises a sunroof, for example.

Furthermore, the development in vehicle manufacturing is increasingly focusing on autonomously and semi-autonomously driving motor vehicles. In order to enable the vehicle controller to control the motor vehicle autonomously or semi-autonomously, a plurality of environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the acquired environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by signal evaluation and to be used for controlling the vehicle.

Several approaches for integrating environment sensors in roof modules of this kind have been known. For instance, the environment sensors are often placed on top of the roof skin of the roof module as an attachment unit or disposed on the roof module as retractable and deployable sensor modules in the state of the art. The environment sensors are often covered by a cover and/or the panel component or are disposed in an additional sensor housing. In this case, a see-through area through which the environment sensor can detect the vehicle environment is provided on the sensor housing and/or the panel component and/or the cover.

Moreover, known motor vehicles often comprise further environment sensors which are disposed in an interior or a driver compartment of the motor vehicle and which detect the vehicle environment through the windshield. In the state of the art, these environment sensors are prefabricated as separate sensor modules and are installed on the vehicle body separately from the roof module after the installation of the roof module on the vehicle body. In the state of the art, the roof module is typically installed on the vehicle body from above (referred to as top load mounting). Subsequently, further environment sensors are installed in an interior of the motor vehicle. This increases the number of installation steps required. Moreover, it increases the complexity of the vehicle structure. Also, an achievable modularity is reduced. Moreover, the preparation of individual vehicle components as a structural unit is limited since individual and/or additional components still have to be installed. Overall, this increases the weight of the vehicle and the production costs for the motor vehicle.

SUMMARY

These disadvantages are to be eliminated or reduced by the integrated solution of this invention, which is optimized in terms of installation space, production and assembly.

An object of the present invention is to propose a motor vehicle which has an improved design, in particular a design optimized in terms of installation space, and which at least reduces the disadvantages of the known state of the art described above.

This object is attained by a motor vehicle according to the teaching of claim 1. Furthermore, the object is attained by a motor vehicle according to the teaching of claim 11.

Advantageous embodiments of the invention are the subject matter of the dependent claims. Moreover, any and all combinations of at least two features disclosed in the description, the claims, and/or the figures fall within the scope of the invention. Naturally, the explanations given in connection with the motor vehicle according to claim 1 equivalently relate to the motor vehicle according to claim 11 without being mentioned separately in its context. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The motor vehicle according to a first aspect of the invention comprises a vehicle body, a windshield and/or a rear window, and a roof module disposed on the vehicle body as a structural unit and at least partially forming a vehicle roof of the motor vehicle. The roof module comprises a see-through area and a panel component which at least partially forms a roof skin of the vehicle roof, the roof skin serving as an outer sealing surface. Furthermore, the roof module comprises at least two environment sensors for detecting a vehicle environment. The motor vehicle is characterized in that one of the at least two environment sensors is attached to the roof module and configured to send and/or receive electromagnetic signals through the windshield or the rear window in order to detect a vehicle environment, and in that another one of the at least two environment sensors is attached to the roof module and configured to send and/or receive electromagnetic signals through the see-through area.

The motor vehicle according to a second aspect of the invention comprises a vehicle body, a windshield and/or a rear window, and a roof module disposed on the vehicle body as a structural unit and at least partially forming a vehicle roof of the motor vehicle. The roof module comprises a panel component which at least partially forms a roof skin of the vehicle roof, the roof skin serving as an outer sealing surface. Furthermore, the roof module comprises at least two environment sensors for detecting a vehicle environment. The motor vehicle according to the second aspect is characterized in that the at least two environment sensors are attached to the roof module and are each configured to send/and or receive electromagnetic signals through the windshield and/or the rear window in order to detect a vehicle environment.

The two motor vehicles according to the first and second aspects of the invention describe stand-alone alternative solutions for overcoming or at least reducing the disadvantages of the state of the art mentioned above. Since the at least two environment sensors are disposed on the roof module, it is now possible for the roof module to be placed on the vehicle body as a structural unit without having to install further environment sensors afterward, i.e., in another work step. Instead, the at least two environment sensors are preinstalled on the roof module and can be connected to the vehicle body in one work step. At least one of the two environment sensors is installed on the roof module in such a manner that it uses at least a portion of the windshield and/or the rear window for sending and/or receiving the electromagnetic signals through it. This is particularly advantageous since the environment sensor in question does not need an additional see-through area, which means that the roof module can be of a more compact design or more installation space is available for other components.

In other words, according to the invention, additional environment sensors, which used to be arranged on the vehicle as extra components in the state of the art, are comprised in the roof module or are integrated in the roof sensor module. The additional environment sensors are attached to or installed on a roof module frame and/or on the panel component, for example. In principle, the environment sensors can be installed from above, from below and/or laterally. The roof module can preferably be placed on the vehicle body from above (referred to as top load mounting) or from below (referred to as bottom load mounting) or laterally. According to the invention, the windshield and/or the rear window is/are preferably configured in such a manner that it/they are elongated in the direction of a roof module center. For example, the windshield and/or the rear window extend(s) further upward and/or rearward (in the case of the windshield) and/or forward (in the case of the rear window) compared to the state of the art when viewed in a direction of travel of the vehicle. The windshield and/or the rear window is/are preferably attached, e.g., glued, to the vehicle body, e.g., to a transverse and/or longitudinal rail, or to the roof module. The transverse and/or longitudinal rail of the vehicle body can also be comprised in the roof module. In this case, some environment sensors can preferably use the windshield or the rear window as a see-through area. Additionally, some environment sensors can use a see-through area comprised in the roof module for sending and/or receiving the sensor signals.

Of course, the at least two environment sensors can each be comprised in a sensor housing. In this case, another housing see-through area through which the environment sensor in question can send and/or receive the electromagnetic signals is preferably provided on such a sensor housing. This housing see-through area must preferably not be confused with the see-through area according to the invention since this see-through area is preferably comprised by, in particular integrated or embedded in or formed integrally with, the panel component.

According to the invention, the roof module is attached to the vehicle body, in particular to a roof body frame of a motor vehicle, as a structural unit, in particular via a roof module frame. The roof module can form a structural unit in which features for autonomous or semi-autonomous driving assisted by driving assistance systems are integrated, which are attached to a vehicle carcass, e.g., to a vehicle body and/or a roof frame structure, as a unit by a vehicle manufacturer. The longitudinal rails essentially extend along a longitudinal direction of the motor vehicle. The transverse rails preferably extend in a vehicle width direction of the motor vehicle, i.e., transverse, preferably perpendicular, and essentially horizontal to the direction of travel of the motor vehicle. The roof module can preferably be connected, e.g., glued, screwed and/or bolted, to the roof frame structure of a motor vehicle via the roof module frame. Furthermore the roof module according to the invention can be a purely fixed roof or a roof including a roof opening system, the roof module being configured to be placed on or inserted into the roof frame structure, which is part of a vehicle body. The roof module can be configured for use with a passenger car or a utility vehicle. The roof module can preferably be provided as a structural unit in the form of a roof sensor module (RSM), in which the environment sensors and other electrical components for (semi-)autonomous driving are provided.

"At least two" means that the motor vehicle can comprise two or more than two of the components in question.

In a preferred embodiment, the see-through area is disposed on or integrated in the panel component. The see-through area is preferably a window on the panel component and particularly preferably transparent to a wavelength used by the other one of the at least two environment sensors or a wavelength spectrum used by the other one of the at least two environment sensors. The see-through area can be nontransparent to other wavelengths; for example, it can be opaque to wavelengths in the visible wavelength range. The see-through area can be made of plastic or glass. The see-through area can be in one piece with the panel component. Alternatively, the see-through area can be integrated in the panel component or can be disposed thereon as an extra component. For example, polycarbonate is a possible material for the see-through area of the roof module. The panel component can also be made of this material, for example. The environment sensor is particularly preferably a lidar sensor. For example, lidar sensors operate in a wavelength range of 905 nm or approximately 1550 nm. The material of the see-through area, through which the lidar sensor looks, is preferably transparent to the wavelength range used by the environment sensor and is accordingly selected as a function of the wavelength(s) used by the environment sensor. For example, a lidar-transparent polycarbonate which appears black or opaque is a possible material.

In a preferred embodiment, the other one of the at least two environment sensors is disposed in a housing, which is disposed on the roof module in such a manner that it can be retracted and deployed relative to the panel component. The see-through area is particularly preferably disposed on the housing or integrated in the housing. For example, the see-through area can form a side wall of the housing or can be disposed in a side wall of the housing or can be integrated in a side wall of the housing. For example, the housing can be retracted and deployed by a translational and/or a rotational movement. The housing including the environment sensor is preferably mounted on a support structure of the roof module. The environment sensor including the housing preferably forms a sensor module. Regarding the material of the see-through area, reference is made to the preceding paragraph, which applies analogously in this case.

In a preferred embodiment, at least one of the at least two environment sensors is attached to the panel component of the roof module. For example, the environment sensor can be disposed directly on the panel component, in particular on the inside of the roof. The environment sensor can be disposed indirectly on the panel component via at least one mounting profile and/or any other component. In principle, the at least two environment sensors can also be disposed on the panel component.

In a preferred embodiment, the roof module comprises a roof module frame, which is connected to the panel component and via which the roof module is attached to the vehicle body, at least one of the at least two environment sensors being disposed on the roof module frame. The roof module frame preferably serves as a stiffening component of the roof module. The roof module frame does not necessarily have to comprise a self-contained frame structure. For example, the roof module frame may merely comprise a transverse and/or longitudinal rail. For example, a transverse and/or longitudinal roof rail of the vehicle body can be part of the roof module frame. This constitutes an extended roof module, which can be disposed on a simplified vehicle body, for example. In other words, the roof module preferably comprises at least one longitudinal and/or transverse roof rail, which would normally be part of the vehicle body and via which the roof module is connected to the rest of the vehicle body.

Alternatively, as in the classical case, the vehicle body comprises at least one longitudinal and/or transverse roof rail to which the roof module is attached. Preferably, the roof module is disposed on a body roof frame of the vehicle body.

In a preferred embodiment, the roof module frame protrudes in the direction of the windshield and/or the rear window, in particular when viewed horizontally, in such a manner that it forms a mounting platform for the one of the at least two environment sensors. For example, the roof module frame can comprise one or more than one mounting profile and/or support structure on which the environment sensor is disposed in such a manner that it can look through the windshield and/or the rear window. For example, this can be achieved if the mounting platform is located below the roof skin when viewed in the direction of a vehicle interior, meaning the environment sensor is disposed at the same height as an upper edge of the windshield and/or the rear window.

In a preferred embodiment, the roof module with the at least two environment sensors is disposed on the vehicle body as a pre-assembled structural unit. In this way, the roof module can be prefabricated. Subsequently, the roof module can be delivered to an assembly line of an OEM, where it simply has to be connected to the vehicle body.

In a preferred embodiment, the windshield and/or the rear window is attached to a connecting portion of the roof module frame in a connection point, the connecting portion protruding in the direction of a line of sight of the environment sensor. In addition, the windshield and/or the rear window is disposed on the at least one transverse roof rail of the roof module or the at least one transverse roof rail of the vehicle body, in particular attached thereto in at least one connection point, in the area of a roof end area of the windshield and/or the rear window. In the direction of a roof center, the windshield and/or the rear window can preferably be adjacent to the panel component of the roof module, the panel component preferably being sealed from a roof edge of the windshield and/or the rear window in a sealing point. The see-through area is preferably provided on the panel component in the area of transition between the end of the windshield and/or the rear window and the panel component. In this embodiment, the windshield and/or the rear window preferably at least partially extends over and/or covers the roof module frame so as to be disposed thereon and/or attached thereto.

In a preferred embodiment according to the second aspect, the windshield and/or the rear window is attached to a connecting portion of the roof module frame in a connection point, the connecting portion protruding in the direction of a line of sight of the environment sensor. Furthermore, at least one of the transverse rails formed by the roof module or the vehicle body is shifted in the direction of a roof center so as to serve as an in particular terminal attachment portion of the windshield and/or the rear window, which is/are elongated in the direction of the roof center. Alternatively or additionally, the windshield and/or the rear window is disposed on the at least one transverse roof rail of the roof module or on the at least one transverse roof rail of the vehicle body, in particular attached thereto in at least one connection point, in the area of a roof end area of the elongated windshield and/or the elongated rear window. The connection point preferably serves as a bracing for preventing the windshield and/or rear window, which is/are elongated in the direction of the roof center, from sagging. The at least one transverse rail is preferably shifted backward in the direction of the roof center (when viewed in the direction of travel) so as to serve as an attachment point of the windshield, which is elongated backward. In another embodiment, the at least one transverse rail preferably is shifted forward in the direction of the roof center (when viewed in the direction of travel) so as to serve as an attachment point of the rear window, which is elongated forward.

In a preferred embodiment, the environment sensor comprises a lidar sensor and/or a radar sensor and/or a camera sensor and/or a multi-camera sensor and/or an ultrasonic sensor and/or rain sensors. Other types of sensors which are not mentioned here and which can be used in the area of roof modules are also comprised herein.

Of course, the embodiments and the illustrative examples mentioned above and yet to be discussed below can be realized not only individually but also in any combination with each other without departing from the scope of the present invention. Moreover, any and all embodiments and illustrative examples of the motor vehicle according to claim 1 also relate to the motor vehicle according to claim 11.

BRIEF DESCRIPTIONS OF THE DRAWINGS

Embodiments of the invention are schematically illustrated in the drawings and will be discussed as examples below.

DETAILED DESCRIPTION

Figure 1:
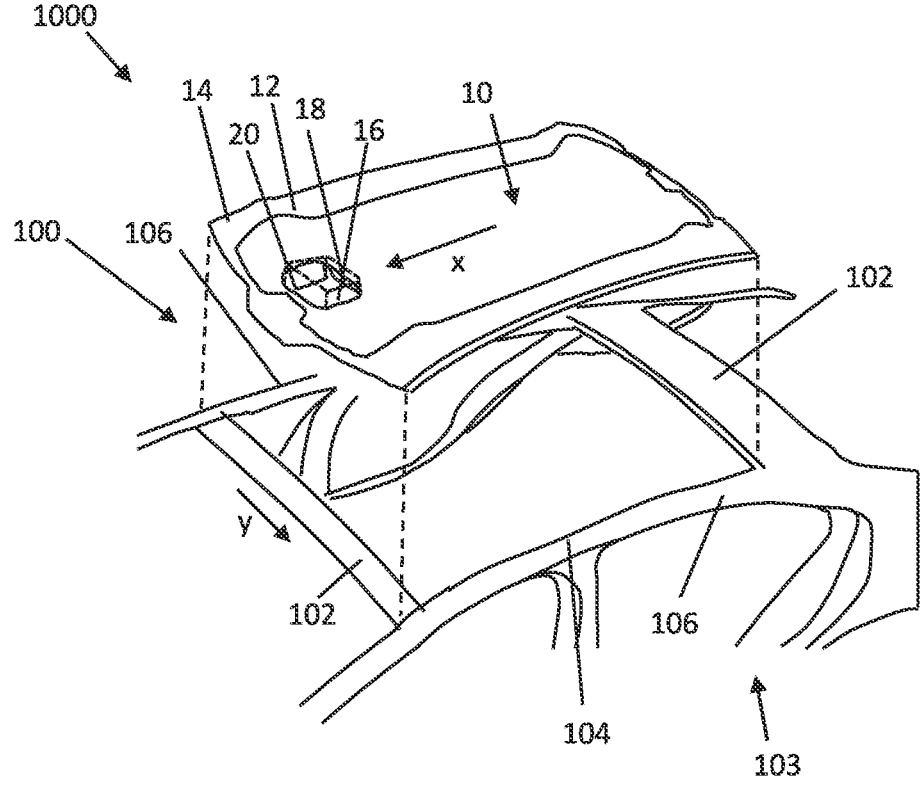
FIG. 1 is a schematic view of an exemplary embodiment of a motor vehicle comprising a roof module.

FIG. 1 shows a motor vehicle 1000 (not shown in full), which comprises a vehicle roof 100. According to the invention, vehicle roof 100 is a roof module 10, in particular a roof sensor module. Roof module 10 is inserted into a body roof frame 104 of vehicle body 103 or placed on the at least two transverse rails 102 and at least two longitudinal rails 106, which form roof frame 104, as a structural unit.

Roof module 10 comprises a panel component 12 for forming a roof skin 14 of vehicle roof 100. In a front area of vehicle roof 100 or roof module 10 (when viewed in a longitudinal vehicle direction x), an environment sensor 16 is disposed symmetrically with respect to longitudinal vehicle axis x. Environment sensor 16 is disposed in a housing 18. In the case at hand, environment sensor 16 is a lidar sensor as an example.

However, other sensor types used for (semi-)autonomous driving, such as (multidirectional) cameras, can be used, as well. Housing 18 forms a dry area, in which environment sensor 16 is disposed in a moisture-proof manner. Housing 18 is mounted on roof module 10, in particular in a roof opening of roof skin 14, in a pivotable manner and can be retracted and deployed relative to roof skin 14. In the case at hand, environment sensor 16 is disposed directly behind a front transverse rail 102, which defines a roof header of the vehicle.

Figure 2:
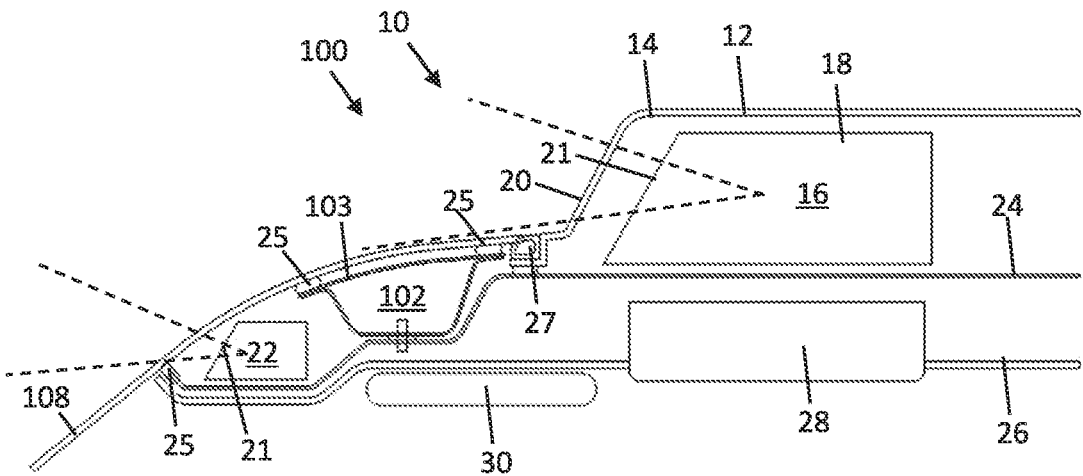
FIG. 2 is a sectional view of a section of a motor vehicle.
Figure 3:
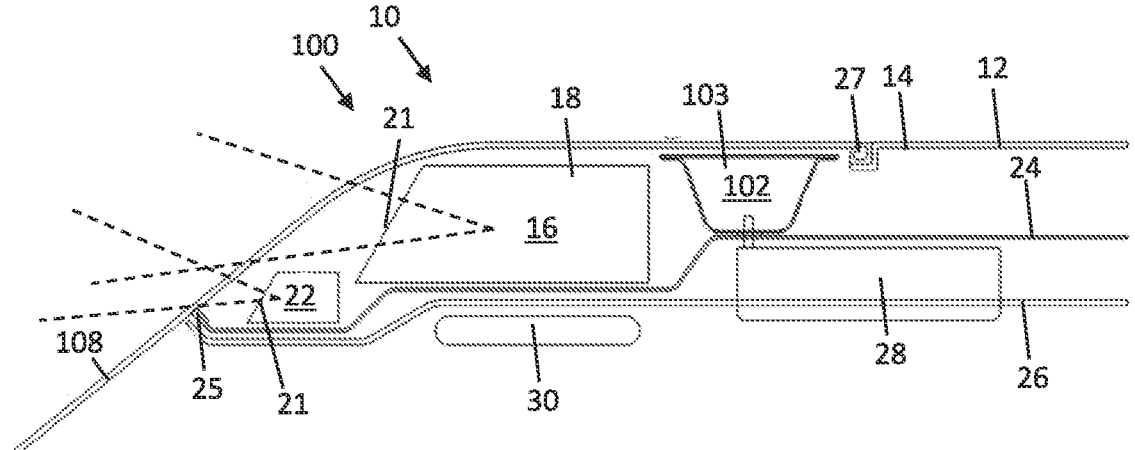
FIG. 3 is a sectional view of a section of a motor vehicle.

In alternative embodiments, see FIGS. 2 and 3, for example, environment sensor 16 is disposed inside roof module 10 and is covered by panel component 12, for example.

Alternatively, environment sensor 16 can also be disposed on panel component 12 in a fixed manner.

Depending on the placement and the adjustability of environment sensor 16, housing 18 and/or panel component 12 comprises a see-through area 20. See-through area 20 is preferably made of an in particular shatter-proof plastic or glass or another (semi-)transparent material. As an example, environment sensor 16 is oriented along an optical axis parallel to longitudinal vehicle direction x as an example. Environment sensor 16 is attached to roof module 10 and configured to send and/or receive electromagnetic signals through see-through area 20. According to FIGS. 2 and 3, environment sensor 16 looks through two see through areas 20 and 21, which are disposed one behind the other. See-through area 20 is provided on panel component 12, as described above. Housing see-through area 21 is provided on housing 18 of environment sensor 16.

Furthermore, roof module 10 according to the invention comprises an environment sensor 22 (see FIGS. 2 and 3), which is covered by panel component 12 in the case of FIG. 1 and therefore not shown. In the case at hand, environment sensor 22 is disposed on roof module 10 in such a manner that it is configured to send and/or receive electromagnetic signals through a windshield 108 or a rear window (not shown) when roof module 10 is in the installed state. In FIG. 1, windshield 108 has not yet been installed on motor vehicle 1000. According to the invention, this does not take place until after the installation of roof module 10. Windshield 108 is shown in FIGS. 2 and 3. Particularly preferably, environment sensor 22 also looks through a housing see-through area 21, which is provided on a preferred housing of environment sensor 22 (see FIGS. 2 and 3).

According to FIGS. 2 and 3, roof module 10 comprises a roof module frame 24. Roof module frame 24 is connected, in particular glued, to panel component 12, see FIG. 2. Roof module frame 24 serves to stiffen roof module 10. Furthermore, roof module frame 24 serves to arrange roof module 10 on vehicle body 103 (see FIG. 2). In FIG. 2, roof module 10 is mounted on vehicle body 103, which is represented by front transverse rail 102, from below (bottom load mounting). Of course, a position of the exemplarily shown transverse rail can also be shifted in a direction opposite to the direction of travel (in the opposite X-direction) (see FIG. 3). Environment sensors 16 and 22 can also be disposed in different positions in roof module 10, in principle. Transverse rail 102 can also be integrated in roof module frame 24 in other configurations.

FIG. 3 shows another configuration of motor vehicle 1000, in which the at least two environment sensors 16 and 22 are disposed on roof module 10 in such a manner that they can both send and/or receive electromagnetic signals through windshield 108. To this end, transverse rail 102 is shifted in the direction of a roof module center. In this configuration, windshield 108 thus extends further backward and upward in the direction of the roof module center, as clearly shown in FIG. 3. Environment sensors 16 and 22 thus have overlapping areas of detection, which can be advantageous for redundancy purposes, in particular. The windshield can be connected, in particular glued, to roof module frame 24 in a connection point 25, e.g., glue points, and can be sealed from panel component 12 by a sealing point 27.

Furthermore, FIGS. 2 and 3 show purely optional other components of roof module 10 and/or motor vehicle 1000. A headliner 26 is installed on an underside when viewed in the direction of a vehicle interior. A roof control unit 28 and a sun visor 30 are disposed on headliner 26.

Of course, roof module frame 24 can also run above the at least one transverse rail 102 (cf. FIGS. 2 and 3) in other configurations not shown here in detail. In this case, windshield 108 or the rear window can also be attached, in particular glued, directly to roof module frame 24 at its roof end area. Furthermore, it can of course be possible for at least one of environment sensors 16 and 22 to be attached to roof module frame 24 from below (bottom load), meaning the attachment to or placement on roof module frame 24 from above (top load) as shown in FIGS. 2 and 3 is not to be construed as limiting in any way. In fact, environment sensors 16 and 22 can be disposed on and attached to roof module frame 24 and/or panel component 12 in various ways. For instance, environment sensors 16 and 22 can also be attached to roof module frame 24 and/or panel component 12 laterally.

The invention claimed is:

1. A motor vehicle comprising: a vehicle body, a windshield and/or a rear window, and a roof module disposed on the vehicle body as a structural unit and at least partially forming a vehicle roof of the motor vehicle, the roof module comprising a see-through area, a panel component which at least partially forms a roof skin of the vehicle roof, the roof skin serving as an outer sealing surface, and at least two environment sensors for detecting a vehicle environment, wherein one of the at least two environment sensors is attached to the roof module and configured to send and/or receive electromagnetic signals through the windshield or the rear window in order to detect a vehicle environment, and another one of the at least two environment sensors is attached to the roof module and configured to send and/or receive electromagnetic signals through the see-through area.

2. The motor vehicle according to claim 1, wherein the see-through area is disposed on the panel component or integrated in the panel component.

3. The motor vehicle according to claim 1, wherein the another one of the at least two environment sensors is disposed in a housing, which is disposed on the roof module in such a manner that it can be retracted and deployed relative to the panel component, and the see-through area is disposed on the housing or integrated in the housing.

4. The motor vehicle according to claim 1, wherein at least one of the at least two environment sensors is attached to the panel component of the roof module.

5. The motor vehicle according to claim 1, wherein the roof module comprises a roof module frame which is connected to the panel component and via which the roof module is attached to the vehicle body, at least one of the at least two environment sensors being disposed on the roof module frame.

6. The motor vehicle according to claim 1, wherein the vehicle body comprises at least one transverse and/or longitudinal roof rail to which the roof module is attached.

7. The motor vehicle according to claim 1, wherein the roof module comprises at least one longitudinal and/or transverse roof rail via which the roof module is connected to the vehicle body.

8. The motor vehicle according to claim 5, wherein the roof module frame protrudes in the direction of the windshield and/or the rear window when viewed horizontally in such a manner that it forms a mounting platform for the one of the at least two environment sensors.

9. The motor vehicle according to claim 1, wherein the roof module with the at least two environment sensors is disposed on the vehicle body as a pre-assembled structural unit.

10. The motor vehicle according to claim 5, wherein the windshield and/or the rear window is attached to a connecting portion of the roof module frame in a connection point, the connecting portion protruding in the direction of a line of sight of the environment sensor, and the windshield and/or the rear window is disposed on the at least one transverse roof rail of the roof module or the at least one transverse roof rail of the vehicle body, attached thereto in at least one connection point, in the area of a roof end area of the windshield and/or the rear window.

11. A motor vehicle comprising: a vehicle body, a windshield and/or a rear window, and a roof module disposed on the vehicle body as a structural unit and at least partially forming a vehicle roof of the motor vehicle, the roof module comprising a panel component which at least partially forms a roof skin of the vehicle roof, the roof skin serving as an outer sealing surface, and at least two environment sensors for detecting a vehicle environment, wherein the at least two environment sensors are attached to the roof module and are each configured to send/and or receive electromagnetic signals through the windshield and/or the rear window to detect a vehicle environment;

wherein at least one of the at least two environment sensors is attached to the panel component of the roof module, and/or the roof module comprises a roof module frame which is connected to the panel component and via which the roof module is attached to the vehicle body, at least one of the at least two environment sensors being disposed on the roof module frame;

wherein the windshield and/or the rear window is attached to a connecting portion of the roof module frame in a connection point, the connecting portion protruding in the direction of a line of sight of the environment sensor, and at least one of transverse rails formed by the roof module or the vehicle body is shifted in the direction of a roof center to serve as an attachment portion of the windshield and/or the rear window, which is elongated in the direction of the roof center, and the windshield and/or the rear window is disposed on the at least one transverse roof rail of the roof module or the at least one transverse roof rail of the vehicle body attached thereto in at least one connection point, in the area of a roof end area of the elongated windshield and/or the elongated rear window.

12. The motor vehicle according to claim 11, wherein the roof module frame protrudes in the direction of the windshield and/or the rear window when viewed horizontally in such a manner that it forms a mounting platform for the one of the at least two environment sensors.

* * * * *